J. A. LE ROY.
KINETOSCOPE SHUTTER SETTING DEVICE.
APPLICATION FILED JAN. 16, 1914.
1,102,767.
Patented July 7, 1914.
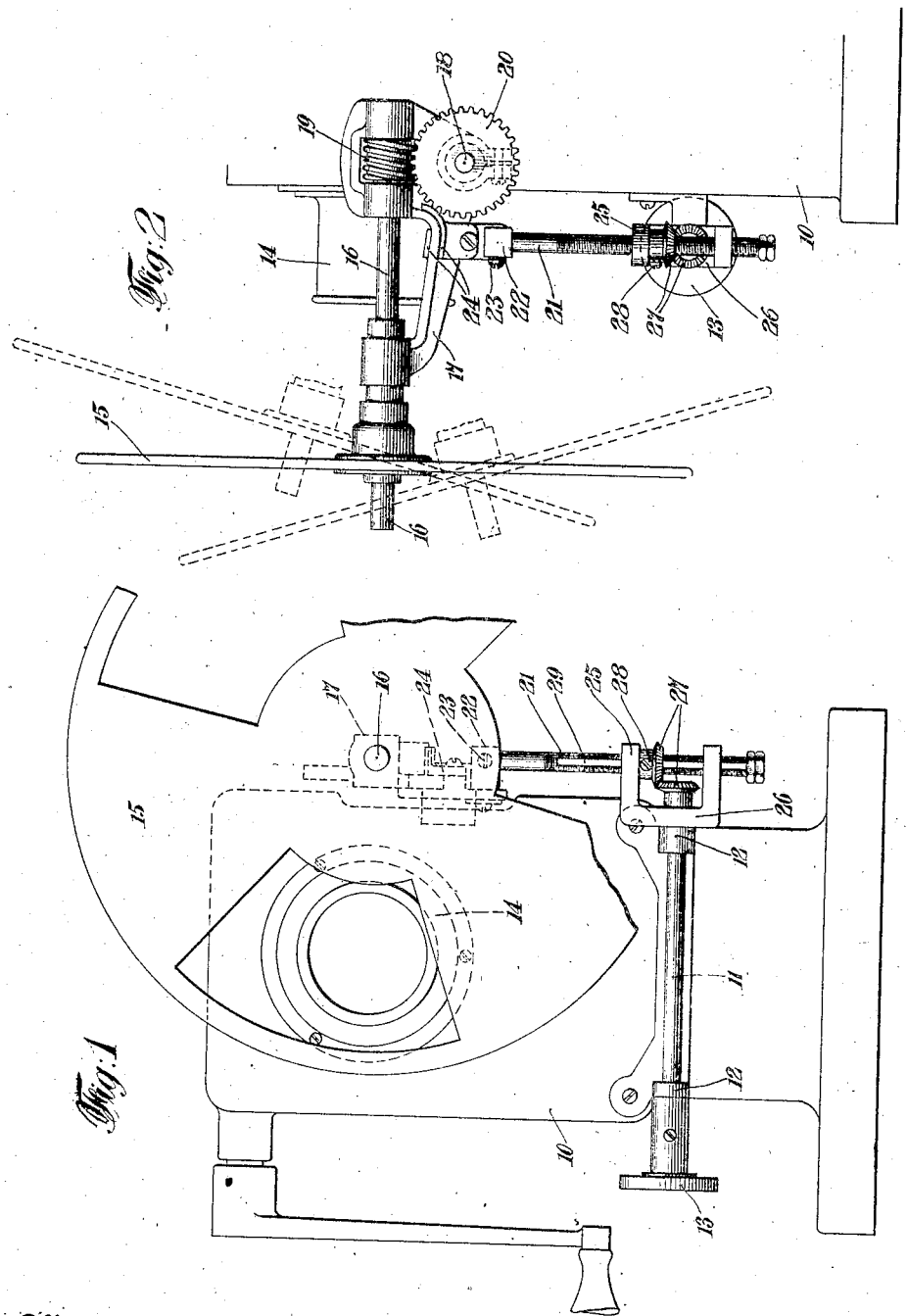
Witnesses:
John E. Prager
A. Worden Gibbs
Inventor
Jean A Le Roy
By his Attorney
Orth F. Schuck

UNITED STATES PATENT OFFICE.

JEAN A. LE ROY, OF NEW YORK, N. Y.

KINETOSCOPE-SHUTTER-SETTING DEVICE.

1,102,767.  Specification of Letters Patent.  Patented July 7, 1914.

Application filed January 16, 1914. Serial No. 812,379.

*To all whom it may concern:*

Be it known that I, JEAN A. LE ROY, a citizen of the United States, and a resident of New York, in the county of New York and State of New York, have invented certain new and useful Improvements in Kinetoscope-Shutter-Setting Devices, of which the following is a specification.

The invention relates to kinetoscopes, and more particularly to a device or attachment to coöperate with the shutter thereof. The device may be built integrally with the kinetoscope, but is adapted, also, for attachment to existing machines, particularly such in which the shutter is hingedly supported in front of the lens as for convenience in packing and transportation.

The invention has for its object to so adjust the shutter that there may be avoided the "ghost" and the flicker produced on the projected image when the cut-off blade of the shutter is respectively behind or ahead of a picture in transition. The adjustment may be made in initially setting or timing the apparatus and greatly simplifies this operation; or, it may be made in case the film and shutter are thrown out of synchronism in framing, or from lost motion caused by wear.

The nature of the invention will be best understood when described in connection with the accompanying drawings, in which—

Figure 1 is a front elevation of part of a kinetoscope and show the attachment provided thereon. Fig. 2 is a similar view of one side of the kinetoscope.

Similar characters of reference designate corresponding parts throughout the several views.

In carrying out the invention, means are provided to effect a relative angular adjustment between the plane of the shutter and the projecting lens (picture image) and whereby, though the shutter speed be constant, the time may be varied at which a given portion of a shutter blade arrives at a particular point of the lens or image of picture. This is effected by tilting the shutter either inwardly or outwardly as the case may be and as indicated by the positions shown in dotted lines, Fig. 2. The operating means for this purpose, for example, a handle or screw, may be conveniently located with respect to the other operating mechanism of the kinetoscope. In the present embodiment, the same is shown located at the side of the frame 10 of the kinetoscope and consists of a spindle 11 mounted to turn in suitable bearings 12 attached to said frame, a milled head 13 being provided at the outer end for convenient manipulation. The lens 14 (objective) is fixedly secured to the frame 10 in the present embodiment and a shutter 15, for example a rotary shutter of usual design, is mounted before the same, the axis thereof being arranged to lie normally parallel to the longitudinal axis of the lens. A shaft 16 to rotate the shutter is mounted at the side of the kinetoscope in a suitable support 17, which is pivotally attached as to the frame 10 upon a stud 18 of said frame; and the said shaft is rotated from the film operating mechanism of the kinetoscope through a worm 19 at its inner end and a gear 20 of said film operating mechanism engaging the worm. Shaft 16 and its support 17 may thus be tilted, that is, caused to swing about said stud 18 as a center, whereby the plane of the shutter will be inclined either toward or away from a plane perpendicular to the axis of the said lens.

To effect the swinging or tilting, any convenient mechanism may be employed, and I have herein shown a threaded rod 21 flexibly connected to the support 17 in manner such that when the rod is raised or lowered the said support will be correspondingly swung about stud 18. For this purpose, the upper end of rod fits into a bearing 22 and is provided with a peripheral groove (not shown) into which fits a pin 23 extending through the bearing. The bearing, in turn, is pivotally attached to a clamp 24 rigidly held to the shutter support. This enables the attachment to be readily removed or secured to a kinetoscope. The rod 21 is raised or lowered by causing it to pass through the tapped arm 25 of a bifurcated guide piece 26 through which passes the spindle 11, the rotation of said spindle being transmitted to the said rod through a pair of bevel gears 27, one of which is mounted upon the inner end of the spindle and the other upon the said rod and movable longitudinally with respect thereto to drive the same, as by means of a pin 28 thereof fitting a longitudinal groove 29 in the said rod.

I claim:—

1. In a kinetoscope: the combination with a shutter, and a lens with which it is adapted to coöperate; of means to effect an angular displacement between the said lens and the plane of said shutter.

2. In a kinetoscope: the combination with a rotary shutter, and a lens with which it is adapted to coöperate; of means to effect an angular displacement between the said lens and the plane of said shutter.

3. In a kinetoscope: the combination with a pivotally supported shutter, and a lens with which it is adapted to coöperate; of means to tilt said shutter relatively to said lens.

4. In a kinetoscope: a suitable frame; a shutter, and a support therefor pivotally secured to said frame; a lens secured to said frame and adapted to coöperate with said shutter; and means to swing said shutter support.

5. In a kinetoscope: a suitable frame; a shutter pivotally secured thereto; a lens secured to said frame and adapted to coöperate with said shutter; and means mounted on said frame to swing said shutter relatively to said lens.

6. In a kinetoscope: a suitable frame; a shutter, and a support therefor pivotally secured to said frame; a lens secured to said frame; a rod flexibly secured to said shutter support; and means secured to said frame to advance and retract said rod.

7. In a kinetoscope: a shutter support; and means to tilt the same independently of the projecting lens of the kinetoscope.

8. In a kinetoscope: a pivoted shutter support; and means removably attached to said kinetoscope to tilt said shutter support independently of the projecting lens of the kinetoscope.

Signed at New York, in the county of New York, and State of New York, this 14th day of January, A. D. 1914.

JEAN A. LE ROY.

Witnesses:
MARY W. WALLACE,
FRED'K F. SCHUETZ.